(12) United States Patent
Elpermann et al.

(10) Patent No.: US 9,322,645 B2
(45) Date of Patent: Apr. 26, 2016

(54) ROTARY ANGLE SENSOR

(71) Applicant: Hella KGaA Hueck & Co., Lippstadt (DE)

(72) Inventors: Thomas Elpermann, Telgte (DE); Stefan Peters, Lippstadt (DE)

(73) Assignee: HELLA KGAA HUECK & CO. (DE)

( * ) Notice: Subject to any disclaimer, the term of this patent is extended or adjusted under 35 U.S.C. 154(b) by 0 days.

(21) Appl. No.: 14/411,778

(22) PCT Filed: Jun. 29, 2013

(86) PCT No.: PCT/EP2013/063760
§ 371 (c)(1),
(2) Date: Dec. 29, 2014

(87) PCT Pub. No.: WO2014/005961
PCT Pub. Date: Jan. 9, 2014

(65) Prior Publication Data
US 2015/0168140 A1   Jun. 18, 2015

(30) Foreign Application Priority Data
Jul. 4, 2012   (DE) .......................... 10 2012 105 969

(51) Int. Cl.
*G01D 11/24* (2006.01)
*G01B 21/22* (2006.01)
*G01D 5/244* (2006.01)

(52) U.S. Cl.
CPC ............ *G01B 21/22* (2013.01); *G01D 5/24442* (2013.01); *G01D 11/245* (2013.01)

(58) Field of Classification Search
CPC ....... G01B 21/22; G01D 11/24; G01D 11/245
USPC ........................................................... 73/431
See application file for complete search history.

(56) References Cited

U.S. PATENT DOCUMENTS

| | | | | |
|---|---|---|---|---|
| 6,050,785 | A  * | 4/2000 | Horng | 417/354 |
| 6,400,053 | B1 * | 6/2002 | Horng | 310/91 |
| 7,729,118 | B2 * | 6/2010 | Lai et al. | 361/699 |
| 7,830,053 | B2 * | 11/2010 | Lee | 310/89 |
| 7,903,406 | B2 * | 3/2011 | Takemoto | 361/695 |
| 9,074,603 | B2 * | 7/2015 | Wu | |
| 2008/0231128 | A1 * | 9/2008 | Buhler et al. | 310/90.5 |

FOREIGN PATENT DOCUMENTS

DE     4322750 A1 *  1/1995
EP     2383558 A1 * 11/2011

* cited by examiner

*Primary Examiner* — Lisa Caputo
*Assistant Examiner* — Jamel Williams
(74) *Attorney, Agent, or Firm* — Husch Blackwell LLP

(57) ABSTRACT

A rotary angle sensor used to determine a relative angular position as compared to a reference position, comprising a housing (1), at least one rotor (3, 4) that is rotatably mounted inside said housing (1), one circuit board (2) containing electrical and/or electronic components as well as one or multiple stators corresponding to the number of used rotors (3, 4). The rotary angle sensor is supposed to be improved in such a manner that allows for an especially precise alignment of a circuit board inside a housing and an easy installation of said board. This is achieved by the circumstance that bearing surfaces (9) for the circuit board (2) are provided in the direct radial vicinity of the stator inside the housing (1) and that clamping structures (11) are radially aligned with the stator in order to position the circuit board (2).

5 Claims, 4 Drawing Sheets

ROTARY ANGLE SENSOR

CROSS REFERENCE

This application claims priority to PCT/EP2013/063760, filed Jun. 29, 2013, which itself claims priority to German Application No. 10 2012 105 969.1, filed Jul. 4, 2012, which are both hereby incorporated by reference.

FIELD OF TECHNOLOGY

The invention concerns a rotary angle sensor used to determine a relative angular position as compared to a reference position.

BACKGROUND

Such inductive torque sensor devices are generally considered known. They are, for example, being used in motor vehicles in order to determine torque values, such as steering torque. Such measures are becoming increasingly necessary, due to the fact that electromotive servos are being used as steering aids in more and more vehicles. These systems require a value for the steering torque in order to work. The steering torques are determined by a torsion bar inside the steering column using angular differences and calculated from this information. To this end, twists at the end of the torsion bar are converted to electronic signals using a suitable arrangement and fed into other devices for evaluation purposes. The angular differences caused by torsion are determined independently of the position of the steering wheel.

It is additionally important for driver assistance systems, such as ESP (electronic stability program used to influence the driving behavior of the vehicle), to receive information as to the positioning of the steering wheel (relative angular position). For this purpose, the lock of the steering wheel (angle relative to a reference position) is determined. To allow for angles greater or less than 360° to be determined, the reference position is associated with an indexing system, which generates a signal for every full revolution of the steering wheel and thereby determines the number of revolutions performed by the steering wheel. Other methods of determination are possible as well.

EP 1 932 221 B1 describes an electric motor equipped with a sensor to determine the positioning of a rotor, where the sensor is mounted on a connecting panel.

SUMMARY OF THE INVENTION

It is the objective of this invention to provide a rotary angle sensor that is capable of achieving a particularly precise alignment of a circuit board inside a housing and is also easy to install.

This objective is achieved by the properties and features described as part of claim "1". Inside the housing, the bearing surfaces for the circuit board are radially positioned immediately next to at least one stator, while clamping structures used to position the circuit board are radially aligned with respect to the stator. The immediate proximity of bearing surfaces and the stator allows it to be axially positioned—meaning in the rotor's axis of rotation—in a particularly accurate manner and thereby prevents misalignment of the stator. This ensures that a certain predetermined distance between the stator and the structure of the associated rotor is always maintained. The radial alignment of the clamping structures ensures an exact centering of the circuit board with regard to the rotor and therefore the rotor structure.

In one of the developments, the clamping structures are designed in a "T-shape" when viewed from the top. This results in a sufficient contact surface for the circuit board while at the same time requiring only little material to be used.

In another development, sharable lamellae are fitted to every clamping structure. These lamellae can be used to compensate for any manufacturing tolerances as well as different measures of thermal expansion between the circuit board and the housing structure. This prevents that the circuit board moves to an eccentric position in relation to the stator.

In another development, pockets are fitted around the clamping structures. These are used to catch parts of the lamellae that are sheared off when the circuit board is inserted into the housing. These sheared parts therefore cannot cause any mechanical interference.

In another development, the circuit board is clamped in place between the housing and a second cover. This additionally ensures the axial positioning of the circuit board, even if a difference in thermal expansion occurs.

In yet another development, the circuit board is fitted with a hole including recessed auxiliary holes along its perimeter. This facilitates the accurate mounting of the rotary angle sensor.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
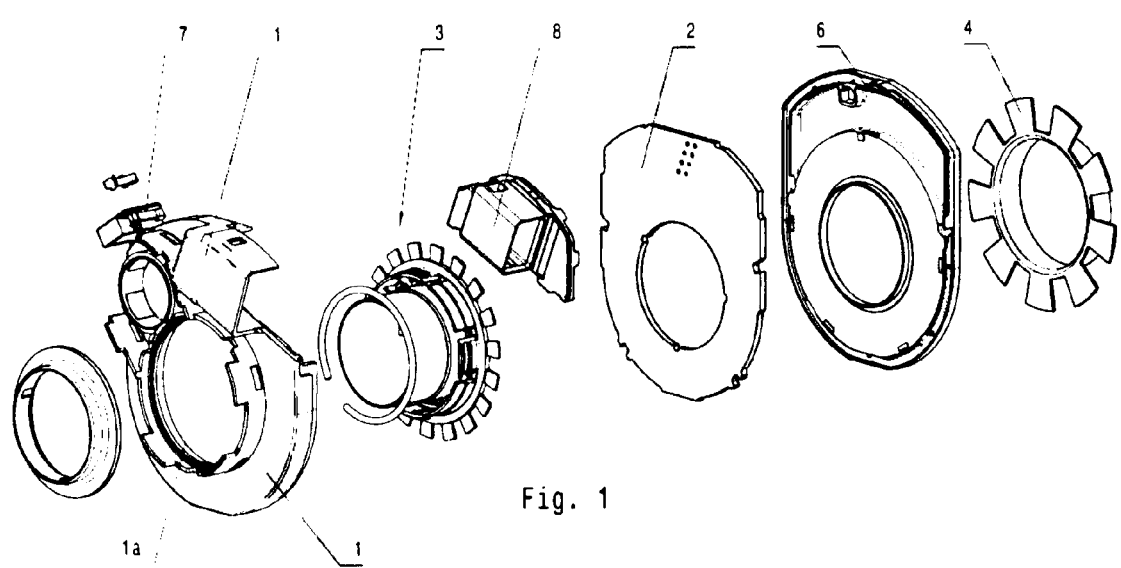
FIG. 1 shows an exploded view of the rotary angle sensor.
Figure 2:
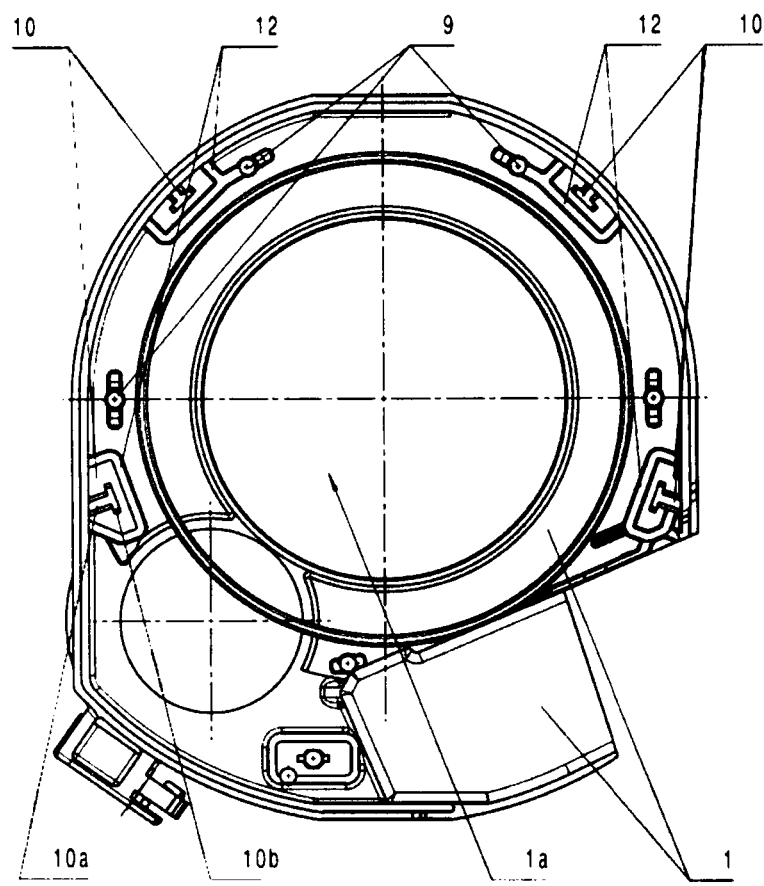
FIG. 2 shows a top view on the housing of the rotary angle sensor.
Figure 3:
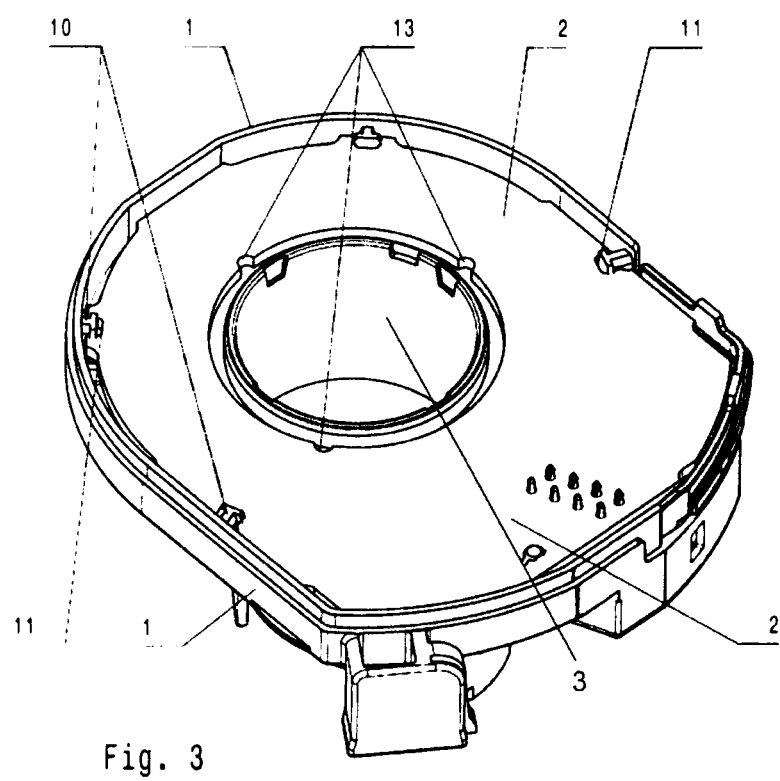
FIG. 3 shows a perspective view of the housing including the circuit board.
Figure 4:
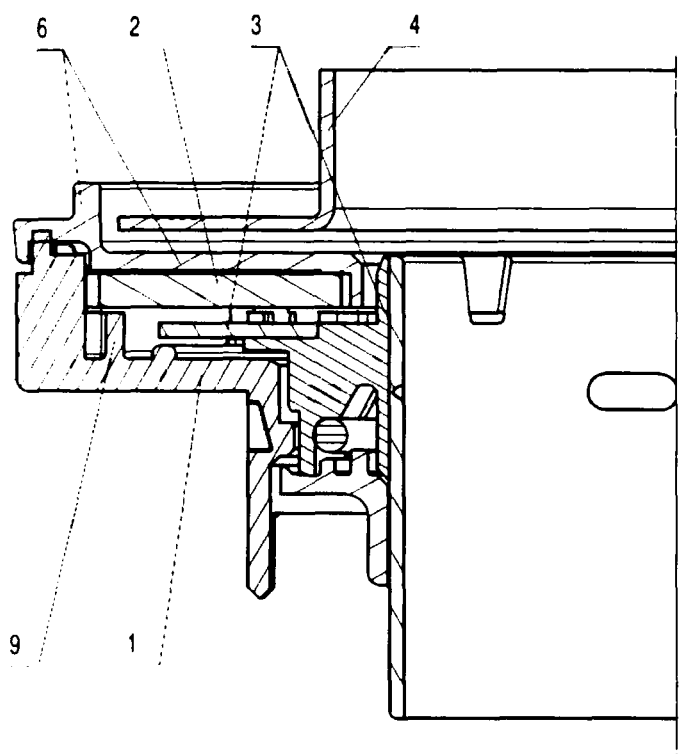
FIG. 4 shows a vertical cross-sectional view of a part of the rotary angle sensor.

As can be seen in FIGS. 1 to 4, the rotary angle sensor comprises a housing 1, on or inside which a circuit board (2) is installed as well as two rotors (3, 4) with different rotor structures that are rotatably mounted. The two main surfaces of the housing (1) are both closed by one cover (6) each, one of which is not shown. The rotary angle sensor is, for example, assigned to a steering column when used in a motor vehicle, whereas the rotors (3, 4) co-rotate with the installation. The housing (1) is fitted with a corresponding circular opening (1a) that is roughly centrally arranged. In order to mount the housing (1) to a fixed part of a motor vehicle, a connecting piece (7) is provided so that the housing (1) is immobile in relation to the steering movement.

The circuit board (2) assigns circular stators to the rotors (3, 4), for example using conducting paths or electrical and/or electronic components, while each stator is positioned on one of the associated main surfaces of the circuit board (2). The stators are concentrically arranged around a generally circular hole inside the circuit board (2), while this hole is concentric in relation to the opening (1a). The circuit board (2) is fitted to the housing (1) at an exactly predetermined position. A connector (8) is fitted to the circuit board (2) and electrically connected. It is held on the housing (1) when the rotary angle sensor is installed.

The circuit board (2) is clamped to the housing (1).

In order to ensure an exact radial positioning, there is a number of bearing areas (9) in the form of short webs on the housing (1) that are radially distributed around the opening (1a). As seen from above, the upper surfaces of the bearing surfaces (9) are positioned at a bearing level that exhibits a predetermined distance to the rotor structures when the rotors (3, 4) are installed. Small and even distances have to be maintained between the bearing areas (9) and the outer perimeters of the stators. Counter holders corresponding to the bearing surfaces (9) are arranged inside the second cover (6), which is welded to the housing (1) during assembly of the rotary angle sensor, so that the circuit board (2) is clamped between the covers. It is therefore generally ensured that the stators are in their proper positions and maintain the predetermined axial distance to the rotors (3, 4).

Furthermore, clamping structures (10) are arranged within the housing (1), which reveal a T-shaped cross-section when viewed from above. In this regard, every clamping structure (10) extends out of the bearing level from the bottom of the housing (1). A base (10a) of this "T" is mounted on an inner wall of the housing (1) and aligned with the hole in a strictly radial manner A "shoulder" (10b) of this "T" is therefore perpendicular to the radius for every clamping structure (10). The "shoulder" (10b) of the clamping structure (10) serves the purpose of clamping the circuit board (2), which is equipped with recesses (11) at the outer perimeter corresponding to the clamping structures (10). The "shoulder" (10b) of every clamping structure (10) is beveled at its upper end and is fitted with fine lamellae at those surfaces that are not connected with the base (10a). These lamellae are longer than the associated recess (11), meaning that the clamping structure (10), including the lamellae, exhibits larger dimensions than the recess in question. This allows for an exact radial alignment of the circuit board (2) inside the housing (1) with the elastic structure of the lamellae balancing any expansion differences and thereby allows for a largely tension-free mounting of circuit board 2.

A pocket (12) is fitted to every clamping structure (10), which is mounted on the wall of the housing (1) in, for example, a semi-circular manner. The upper end of this pocket (12) is at the bearing level.

Spaced auxiliary holes are provided within the circuit board (2) around the perimeter of the primary hole, which serve as positioning aids for automated assembly tools when installing the rotary angle sensor and allow for an exact relative positioning of the circuit board (2) in relation to the first rotor (3).

When the circuit board (2) is inserted into the housing (1), the portion of the lamellae that corresponds to the "excess" are sheared off by the clamping structures (11) and drops into the corresponding pockets (12). The circuit board (2) is therefore held inside the housing (1) without any play or significant mechanical stress. Due to the fact that the inserted circuit board (2) closes these pockets (12) at the top, the sheared off parts are safely locked away and cannot cause any mechanical impairments of the rotary angle sensor.

LIST OF REFERENCE SIGNS

1 Housing
1a Opening
2 Circuit board
3 First rotor
4 Second rotor
6 Second cover
7 Connecting part
8 Connector
9 Bearing surface
10 Clamping structure
11 Recess
12 Pocket
13 Auxiliary hole

The invention claimed is:

1. A rotary angle sensor used to determine a relative angular position as compared to a reference position, said rotary angle sensor comprising:
    a housing,
    at least one rotor that is rotatably mounted inside the housing and
    a circuit board with electronic components as well as one or more stators corresponding to the amount of used rotors,
    wherein bearing surfaces for the circuit board are provided in the direct radial vicinity of the stator inside the housing and wherein clamping structures are radially aligned with the stator in order to position the circuit board, and wherein there are sharable lamellae on every clamping structure.

2. The rotary angle sensor of claim 1, wherein the clamping structures are "T-shaped" when viewed from above.

3. The rotary angle sensor of claim 1, wherein there is a pocket around every clamping structure.

4. The rotary angle sensor of claim 1 wherein the circuit board is clamped in place between the housing and a second cover.

5. The rotary angle sensor of claim 1 wherein the circuit board exhibits a hole with additional auxiliary holes recessed around its perimeter.

* * * * *